Patented Feb. 12, 1952

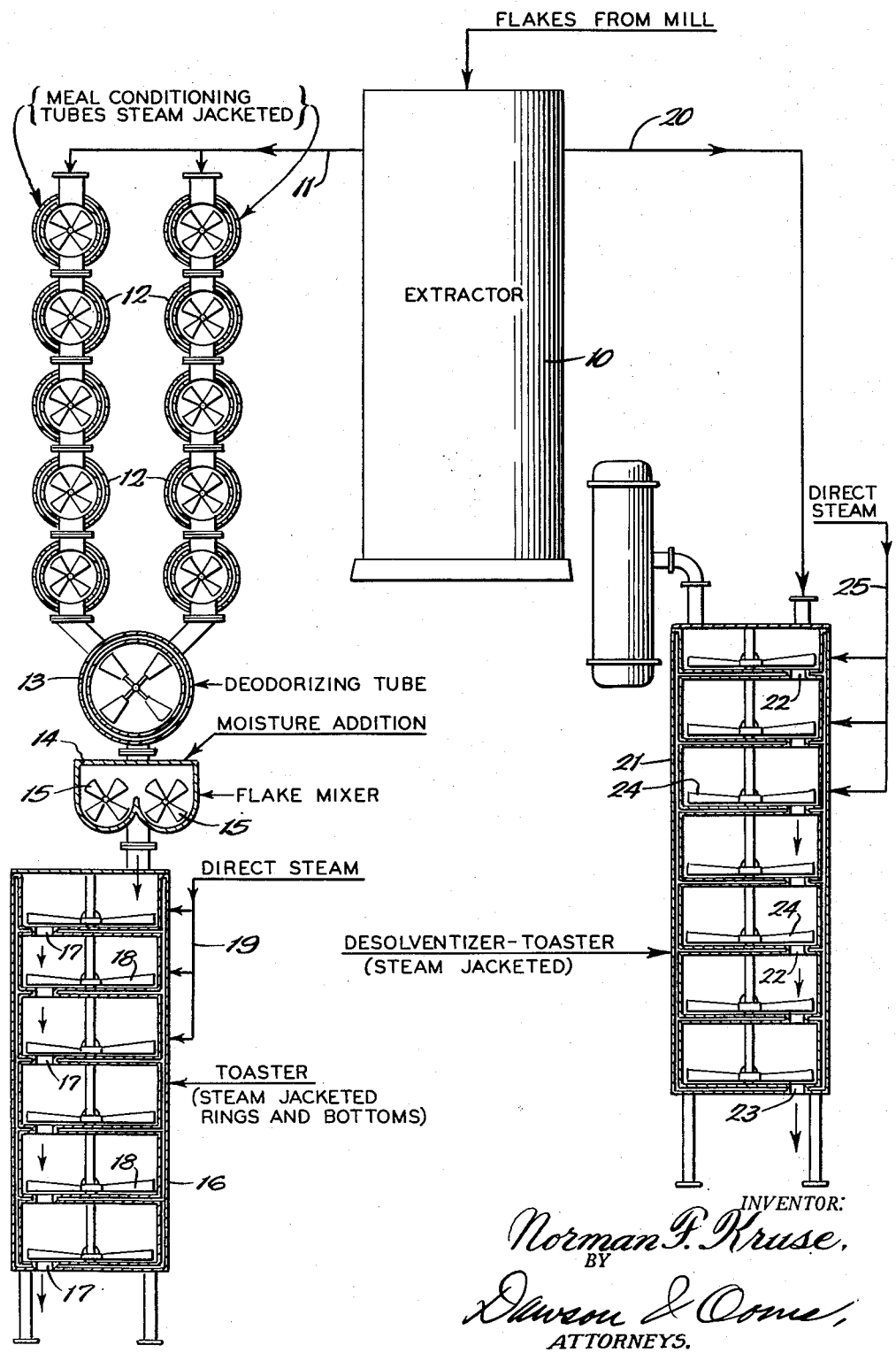

2,585,793

UNITED STATES PATENT OFFICE 2,585,793

SOYBEAN TREATING PROCESS

Norman F. Kruse, Decatur, Ind., assignor to Central Soya Company, Inc., Fort Wayne, Ind., a corporation of Indiana Application November 10, 1950, Serial No. 195,059

8 Claims. (Cl. 99—98)

This invention relates to a soybean treating process and more porticularly to a process in which extracted soybean oil meal is cooked or toasted, while preserving in the finished product a high thiamin content and other nutritional factors.

In United States Patent No. 2,260,254, we have set out advantages flowing from the wetting of soybean oil meal and thereafter subjecting the meal to temperatures above the boiling point of water to develop a food product. One difficulty arising out of the use of the process is with obtaining an even distribution of the moisture throughout the meal. Extracted soybean oil flakes, after the removal of solvent therefrom, are highly porous and contain cells from which the oil has been extracted. It is difficult to bring the moisture into the irregular cell surfaces and in the subsequent heating step such surfaces are treated without moisture being present. As a result, dry heat only is applied to such surfaces and there is a substantial loss of thiamin content and nutritional factors. While there is a substantial advantage obtained with respect to those surfaces which are effectively treated with moisture, there is a loss with respect to the large irregular surfaces and cell areas to which the moisture is not applied.

It has been proposed that steam be utilized for the removal of solvent from substantially oil-free solvent-saturated soybean flakes, care being taken to prevent the flakes from becoming wet so as to adhere to one another. In such a process, the temperatures have been maintained at an elevated point to prevent steam condensation on the flakes and such adherence of the flakes to each other. The difficulty with such a process, which is designed for the removal of solvent, is that the flakes are heated with a dry heat and there is a great loss of thiamin and nutrients.

In the treatment of solvent-saturated flakes, the solvent within the irregular cell areas and the solvent vapors therein prevent moisture from reaching these areas and such areas are exposed solely to dry heat. Thus even if water be added to the flakes, the moisture will not reach the cell areas and such moisture will be evaporated under the high temperatures employed in the cooking operation.

If the extracted soybean oil meal be freed of solvent prior to the cooking step and then subjected to steam, an effective process is not provided because the steam cannot be employed in sufficient quantities to impart the necessary moisture to the flakes. The addition of a relatively small amount of steam raises the meal to a fairly high cooking temperature and there is thus no opportunity to add moisture in substantial amounts to the meal. The addition of jacket steam or insufficient quantities of direct steam, alone or in combination, to spent flakes after extraction has been found not to produce a good result. This is due to the fact that such heat input results in the rapid drying of the product so that the extracted soybean oil meal is toasted or cooked with essentially dry heat. Under such conditions the resulting product has had some of its valuable nutrients destroyed, as well as possessing undesirable physical characteristics such as friability and dustiness.

On the other hand, the addition of large quantities of water to the product does not offer a solution because the water does not thoroughly or uniformly cover the flakes, and I find that some of the flakes have insufficient moisture while others have excessive moisture, and as a result of the excessive moisture some of the flakes become glutinous or glue-like in character.

I have discovered that by adding liquid to the flakes, such as water or solvent (and the solvent employed in extraction may be retained for this purpose), sufficient direct steam can be added to the extracted soybean oil meal to bring the moisture to about 15% and above as a result of condensation of the steam, and that by such condensation the moisture is applied evenly throughout the meal mass so as to apply to each flake its desired quantity of moisture and without excessively adding to the moisture of other flakes. At the same time the condensation of the steam on the meal surfaces serves as a metering of the moisture to give to each flake more or less moisture depending upon the size of the flake, while also applying moisture within the irregular cell surfaces. If a flake is small, it receives a relatively small amount of moisture, while if it is large, it receives a proportionately large amount of moisture, and in each instance the moisture is applied, by the condensation method, within the difficultly accessible cell areas. As a result the flakes are increased throughout in density by the moisture. Heat is transmitted more readily into the interior portions of the flake so that it is effectively cooked quickly while preserving the thiamin content and other nutritional factors. I was surprised to find that even though agglomerates were formed the continued violent steaming with direct steam removed all of the residual solvent while exerting a preserving action on the thiamin or B1 and other nutritional factors, while altering the protein in the meal to give a high value in nutrients. The agglomerates produced are of a uniform golden color throughout and are thus indicative of the high nutrient value extending through the structure of the flake agglomerates.

An object of the present invention is to treat or cook extracted soybean oil meal under heating conditions in which direct steam is employed in such quantity as to supply to the mean a protective moisture content that preserves a high thiamin content and other nutritional factors and develops valuable physical characteristics. A still further object is to provide for the metering of moisture by steam condensation on soybean oil meal so as to apply uniformly thereto a moisture content of about 15% to 30% or higher while employing a temperature above the vaporizing point of water. A further object is to provide a process for the production of a cooked or toasted palatable extracted soybean oil meal having an unusually high B1 content and a product in which the meal flakes have a higher density, a uniform golden color, and a greater percentage of nutrients than heretofore found in an extracted soybean oil meal cooked product. Other specific objects and advantages will appear as the specification proceeds.

The process may be employed in a great variety of forms of apparatus and illustrative apparatus with which the process may be employed is shown in the accompanying drawing in which there is set out in diagrammatic form two forms of apparatus with which the process may be described.

In the drawing, an extractor is indicated by the numeral 10. In the extractor, the soybean meal, which is preferably in the form of flakes, is subjected to a suitable solvent for the removal of the soybean oil. Oil-laden solvent is withdrawn and sent to a recovery still for the separation of the solvent from the oil. The solvent-saturated flakes may then be treated in accordance with my process after the solvent is removed or, if desired, with the solvent still retained by the flakes. Since the apparatus described in the drawing is all well-known in the art, a detailed description of the apparatus is believed to be unnecessary.

In the drawing, two forms of treating apparatus are described. In one form the solvent is removed prior to the addition of moisture to the flakes while in the other apparatus the solvent-saturated flakes are sent directly to a compartmented cooker in which the solvent is removed and moisture added to the flakes within the cooker.

In the apparatus for first removing the solvent before adding moisture, the solvent-saturated flakes are withdrawn from the extractor through line 11 and thence passed through steam jacketed agitator-equipped tubes 12, and thence into a deodorizing tube 13. The solvent vapors are withdrawn and the flakes substantially free of solvent are passed into a mixer 14, to which water is added and the water is mixed with the flakes by the use of agitators 15. I prefer to add sufficient water to bring the moisture content of the flakes up to about 14% or 15% to about 25% or 30%. If desired, the moisture may exceed 30%.

The wet flakes from the mixer are passed into a steam jacketed cooker, compartmented cooker 16 having openings 17 between the compartment floors and having a rotary driven member 18 for spreading the flakes and discharging them through the openings 17. The flakes are passed downwardly through the compartments and are discharged through the outlet 18.

Into several of the compartments, and preferably the upper compartments, I discharge direct steam as indicated by the line 19, so that the steam is violently discharged into the body of the flakes, permeating the flake body and condensing on the flakes. The added water is largely evaporated later in the process. While in United States Patent No. 2,260,254 I advocated the addition of moisture sufficient to bring the content of the meal to at least 15%, I find that, by reason of the effective metering of the moisture to the individual flakes through the medium of steam condensation, a lower moisture content can be employed ranging from about 14% upward. While the moisture may exceed 30%, I prefer not to go above this percentage. I find that optimum results are obtained when the moisture content is in the neighborhood of 15% to 20%.

The jackets preferably extend about the outside of the compartments and also within the floors of the compartments so that jacket steam may thus be employed about each compartment. It is important, however, that the temperature of the jackets be kept at a point below that which would interfere with effective condensation of the steam and only sufficient jacket steam is employed to prevent the material from sticking to the walls or bottoms of the compartments. Thus the direct steam is utilized for its important function of supplying moisture to the individual flakes while also rapidly supplying heat to the innermost surfaces and areas of the flakes.

The addition of moisture to the extracted soybean oil meal increases the specific heat of the meal itself so that the introduction of direct steam into the mass causes considerable steam condensation with heat recovery to produce quick cooking and the development of desirable characteristics. This moist heat process preserves valuable nutrients which dry heat would otherwise destroy. Another desirable effect that is obtained in the liquid-steam process is that of maintaining the moisture content at a relatively high level during the cooking or toasting process. This is important to produce the chemical changes necessary to develop the nutritional qualities and impart the desired physical characteristics.

In the other form of apparatus, in which the solvent-laden flakes are directly treated in a compartmented cooker, the solvent-saturated flakes are withdrawn through line 20 and introduced into the jacketed compartmented cooker 21, which may be very similar to the cooker 16 already described. The flakes are fed downwardly through ports 22 through the various compartments and exit at 23. The sweeps 24 spread the material and feed the flakes downwardly through the several cooking compartments. Into the upper compartment or compartments, I introduce direct steam through line 25 in large amounts so as to vaporize the solvent and remove it. I prefer to introduce a large amount of steam in the uppermost compartment to remove the solvent there and to introduce reduced amounts of steam in the compartment or compartments below. By putting a greater amount of steam in the uppermost compartment, I am able to eliminate the solvent at this stage while at the same time providing a great deal of steam for condensing and providing the moisture in the meal at the very beginning of the cooking process.

The vaporization of the solvent enables me to use a large quantity of direct steam without overheating the flakes and the large amount of steam is thus available for condensing upon the surface areas of the flakes to give each its proper content of moisture. I prefer to employ a content of about 14% and up to about 25%, although if desired the content of moisture may be raised to 30% or higher. I find that optimum results are obtained when the moisture is in the neighborhood of 15%. As the meal passes through the compartmented cooker, the moisture of the flakes in contact with the sweeps produces agglomerates, but while such agglomerates are formed it is surprising to find that the continued violent steaming removes all of the residual solvent while at the same time exerting a preserving action on the $B_1$ and the other nutritional factors, while developing new valuable physical characteristics in the product. The protein present in the meal is altered to give a higher nutritional value and the agglomerates require a uniform golden color throughout. The meal increases substantially in density while retaining a very high thiamin content. By reason of the increase in density formed by the addition of moisture, there is more effective heat transfer to the interior of the flake particle so that the cooking is more uniform throughout and there is very slight difference between the temperature on the outer surface of the particle and that within the interior of the particle.

The maintenance of the moisture at the high levels above indicated during cooking or toasting temperatures enhances the nutritive value of the resulting product. I am not able to explain why the chemical changes produced improve the nutritive value of the resulting product. It may be that of producing a greater availability of the methionine-cystine complex—the moisture in the process having a hydrolytic effect on these amino acids—or the greater preservation of the essential amino acids, lysine, tryptophane, and probably others—and/or the more efficient destruction of the anti-trypsin enzyme present in raw extracted soybean oil meal—account for the improved nutritive value. Because of the more efficient effect of high moisture in destroying the anti-trypsin enzyme, less heat and a shorter period of time are required to produce a more nutritious product containing more of the essential vitamins and amino acids.

In all of the processes described above, I employ a temperature which is above the boiling point of water at substantially atmospheric pressure and during the cooking operation I prefer to keep the meal in motion. A desirable top temperature in the heating or cooking operation is between 225° and 265°. I prefer to employ a temperature not above 300° F. The cooking is desirably and more conveniently done at atmospheric pressure but it will be understood that higher or lower pressures may be employed.

The number of compartments in the cookers may be varied considerably depending upon the results desired. For some products, I find that three or four compartments are satisfactory, and it is possible to use a single compartment. As above stated, the number of compartments may be varied as desired and in accordance with the quality or characteristics of product sought.

The new extracted soybean oil meal, after the above cooking or toasting process, is found to have a $B_1$ or thiamin content of about 8-10.5 $\mu$/g or micrograms, a very low urease content of less than 0.06 pH unit, a water soluble protein content averaging about 8%, and a bulk density lb./cu. ft. of about 41.

The moistened flakes during the cooking operation tend to form agglomerates and the agglomerated product, after cooling, is ground to produce the final product.

The new product has been found to give a greater growth rate to animals than when the animals are fed a high quality dried skimmed milk. White male rats weighing 49 grams initially were fed a semi-purified diet containing adequate amounts of energy, fat and all known minerals and vitamins, and all rations were equated to contain 15% crude protein. After five weeks on tests, rats fed the ration containing the new product weighed 19% more than rats fed on high quality dried skimmed milk as the only source of protein.

Specific examples of the process may be set out as follows:

*Example I*

Extracted soybean flakes remaining after the oil removal in the extraction process are desolventized in conventional type of equipment consisting of steam jacketed conveyor tubes in which the solvent is evaporated by means of direct and indirect steam to produce desolventized flakes of 10% moisture content.

These desolventized extracted soybean flakes at a temperature of approximately 180° F. are then conveyed continuously to a paddle type mixer at the rate of 20 tons per hour. To this flow of flakes a continuous stream of water is applied at the rate of 480 gallons per hour, which combined with that moisture already present in the flakes, produces a total moisture content in the flakes of 20%.

These water-wetted flakes are discharged into a steam jacketed compartmented cooker fitted with a power driven agitator and gate mechanisms for continuous discharge of material from one compartment to another throughout the machine.

Provisions are made for the introduction of direct steam through pipe jets which project into the material. The steam is applied at the rate of 800 lbs. per hour directly to the flow of the wetted flakes into the machine and continuous throughout the early stages of the toasting process. This causes the water wetted extracted soybean oil meal to be rapidly raised within a few minutes to a temperature above the boiling point of water with considerable steam condensation simultaneously occurring upon the extracted soybean oil meal particles. The temperature of the extracted soybean meal is further elevated with the application of jacket heat which causes continued violent steaming and diffusion of moisture throughout the beds of extracted soybean oil meal. Finally, when a temperature of approximately 220° F. is reached the evaporation rate of the water from the extracted soybean oil meal exceeds the condensation rate of the steam upon the meal particles. This permits drying to take place in the latter stages of the process with the further elevation of the meal temperature to 230° F. and reduction in the extracted soybean oil meal moisture content to 13% to 15% as the meal is discharged from the unit.

This extracted soybean oil meal is further dried, cooled, ground and classified to the finished product in the conventional equipment for these unit processes.

Example II

In the process outlined as Example I equally beneficial results may be obtained by using wet steam such as that obtained from a condensate system.

This wet steam is introduced into the paddle type mixer using a sufficient quantity to raise the moisture content of the meal to 20% and rapidly elevate the meal temperature to near the boiling point of water. In this case, the steam condensation causes the earlier elevation of the meal temperature and this hot material is then delivered into the steam jacketed compartmented cooker with the succeeding stages of the process proceeding as outlined in Example I.

Example III

The process as outlined in Example II could equally well be performed by using conventional drying machinery to accomplish the continued steaming, elevation of meal temperature and drying stages of the process.

Example IV

Soybean flakes remaining after the oil removal in the extraction process are partially desolventized in the conventional type of equipment consisting of steam jacketed conveyor tubes in which the solvent is evaporated by means of direct and indirect steam. When the solvent content of the flakes has been reduced from about 35% to approximately 20% and the temperature has increased to above the boiling point of the solvent used, wet steam (see Example II) is introduced to the partially stripped flakes in adequate amounts to not only remove the final quantities of solvent, but also to simultaneously raise the moisture content of desolventized flakes to 15% or greater.

Having already increased the moisture of the flakes by the process outlined above, it is not necessary to add additional quantities of water in a paddle type mixer. Therefore, the flakes may then be directly introduced in to the cooking-toasting type of equipment described in Examples I and III.

Example V

To soybean flakes remaining after the oil removal in the extraction process and still containing all of the adhered solvent is added approximately 5% of water. This added liquid to that already present on the flakes makes it possible to condense large quantities of direct steam on the flakes as well as to improve the thermal conductivity properties of the mixture with respect to direct and indirect steam heat. The net result of this is the rapid removal of solvent and the simultaneous accomplishment of the cooking process previously discussed.

Example VI

Soybean flakes remaining after the oil removal in the extraction process and still containing adhered solvent are continuously conveyed at the rate of 28 tons per hour into a vapor-tight, steam jacketed, compartmented cooker fitted with a power driven agitator and gate mechanism for the discharge of material from one compartment to another throughout the machine.

Direct steam at the rate of 4000 pounds per hour is introduced beneath the bed of flakes in the top compartment or compartments of the cooker. With the simultaneous condensation of the steam on the flake particles, the solvent is removed and the temperature of the flakes rises very rapidly to 210° F. It should be noted that the extraction process must be controlled to leave sufficient solvent adhered to flakes, to cause enough steam to condense and raise the flake moisture content above 15%. The temperature of the meal is further elevated with the application of jacket heat which causes continued violent steaming and diffusion of moisture throughout the beds of meal. Finally, when a temperature of approximately 220° F. is reached the evaporation rate of the water from the meal exceeds the condensation rate of the steam upon the meal particles. This permits drying to take place in the latter stage of the process with the further elevation of the meal temperature to 230° F. and reduction in meal moisture to 13% to 15% as the material is discharged from the unit.

This meal is further dried, cooled, ground and classified to the finished product in the conventional equipment for these unit processes.

Example VII

This process is the same as in Example VI but instead of controlling the amount of solvent adhered to flakes from the extraction process, additional solvent is added to the solvent wetted flakes in the top compartment to insure that sufficient live steam will be condensed to raise the moisture content of the flakes above 15%.

Example VIII

This process is the same as Examples VI or VII to the point where the solvent is removed and the moisture content of the meal has increased to 15% or above. This material is then introduced into a conventional type pressure cooker or toaster where the temperature of the meal is further elevated, causing continued violent steaming and diffusion of moisture throughout the meal.

This extracted cooked or toasted soybean oil meal is then dried, cooled, ground and classified to the finished product in conventional types of equipment for these unit processes.

The product of the above-described process consists of an extracted soybean oil meal having particles of definite rounded structure as distinguished from flaked particles, with a uniform, yellowish-brown particle coloration free of light colored or white particles, a bulk density of over 40 lbs./cu. ft., practically dust free, a thiamin content in excess of 50% of that of the original extracted flakes, free of harmful urease activity, and having high nutritional value due to the availability of essential amino acids.

In the above processes, the heating or cooking is continued until the moisture content, which was increased by the condensation of direct steam, is reduced to any desired point below 13% and this usually requires from 30 to 90 minutes. The time interval, however, can be changed due to changes in temperatures, pressures, etc. It is important that the moisture added by introducing water, etc. into the flakes initially be eliminated, as by vaporization, so that substantially the entire increase in moisture is accomplished finally by the condensation of steam. In other words, whatever the preceding step, I desire that the final distribution of moisture over the flakes, which brings its moisture content substantially from its original content to the desired final content, be accomplished by the condensation of the steam. This is for the purpose of metering the moisture so that there is applied to each particle or flake an amount of moisture commensurate with its surface. Thus there is avoided unequal applications of moisture of the flakes at the time of cooking. Glue-like masses are avoided and instead the flakes thus separately wetted by condensate are made just tack enough to stick to each other in agglomerates while providing over each flake a thin film of moisture for conducting heat into the recesses and cells of the flakes.

The resulting food product is not only useful as a food for animals but as a human food and the product with its unusually high thiamin content is of greatly increased nutritive value.

While in the foregoing specification I have set forth specific steps in considerable detail for the purpose of illustrating an embodiment of the invention, it will be understood that such details may be varied widely by those skilled in the art without departing from the spirit of my invention.

I claim:

1. In a process for treating solvent-extracted soybean oil meal containing liquid, the steps of heating the meal below the boiling point of water, introducing steam into said meal to condense steam thereon to bring the moisture content of the meal into the range of about 14% to 30%, and cooking the meal at a temperature above the boiling point of water.

2. In a process for treating solvent-extracted soybean oil meal containing liquid, the steps of heating the meal below the boiling point of water, introducing steam thereinto and condensing steam thereon to bring the moisture content of the meal to about 14% to 30%, cooking the meal at a temperature above the boiling point of water, and continuing the heating until the moisture is below 13%.

3. In a process for treating solvent-extracted soybean oil meal, the steps of supplying liquid to the meal to wet the same, heating the meal below the boiling point of water, introducing steam into the meal and condensing the same upon said meal to the extent that the moisture content thereof is brought into the range of about 14% to 30%, and cooking the meal at a temperature above the boiling point of water while keeping the meal in motion.

4. In a process for treating solvent-extracted soybean oil meal saturated with solvent, the steps of introducing steam into the meal while the meal is below the boiling point of water but above the vaporizing point of the solvent, to vaporize said solvent, condensing said steam upon said meal to bring the moisture content thereof into the range of about 14% to 30%, and cooking said meal at above the vaporizing point of water.

5. In a process for treating solvent-extracted soybean oil meal saturated with solvent, the steps of heating the meal to a temperature below the boiling point of water but above the boiling point of the solvent, while introducing direct steam into the meal whereby said solvent is vaporized and steam is condensed upon said meal, continuing the introduction of said steam until the moisture content of the meal effected by such condensation is in excess of 14%, cooking said meal at a temperature above the boiling point of water, and continuing the heating of the meal until its moisture content is below 13%.

6. In a process for treating solvent-extracted soybean oil meal containing solvent, the steps of vaporizing the solvent, wetting the meal with water, introducing direct steam into the wetted meal while the temperature thereof is below the boiling point of water, whereby steam is condensed upon the meal to bring the moisture content thereof above 14%, and cooking said meal at a temperature above the boiling point of water.

7. In a process for treating solvent-extracted soybean oil meal from which the solvent has been removed, the steps of heating the meal to a temperature below the boiling point of water, introducing direct steam into the meal and condensing steam on said meal to bring the moisture content thereof to 14%, cooking said meal above the boiling point of water, and continuing the heating thereof until the moisture content is below 13%.

8. In a process for treating solvent-extracted soybean oil wetted with liquid, the steps of heating said meal to a temperature slightly below the boiling point of water, introducing direct steam into the meal to cause said steam to condense upon said meal and to bring the moisture content thereof in the neighborhood of 15% or above, cooking the meal at a temperature above the boiling point of water, and continuing the heating of the meal until the moisture content thereof is below 13% and said meal has acquired a golden color.

NORMAN F. KRUSE.

REFERENCES CITED

The following references are of record in the file of this patent:

UNITED STATES PATENTS

| Number | Name | Date |
| --- | --- | --- |
| 2,260,254 | Kruse | Oct. 21, 1941 |
| 2,379,441 | Kaehler | July 3, 1945 |